(12) United States Patent
Huang et al.

(10) Patent No.: US 7,105,967 B2
(45) Date of Patent: Sep. 12, 2006

(54) HEAT DISSIPATING DEVICE WITH A COMBINATION BEARING ASSEMBLY HAVING MAGNETIC BEARING RINGS AND A SLEEVE BEARING

(75) Inventors: Wen-Shi Huang, Taoyuan (TW); Shun-Chen Chang, Taoyuan (TW)

(73) Assignee: Delta Electronics Inc., Taoyuan Hsien (TW)

( * ) Notice: Subject to any disclaimer, the term of this patent is extended or adjusted under 35 U.S.C. 154(b) by 73 days.

(21) Appl. No.: 10/656,331

(22) Filed: Sep. 8, 2003

(65) Prior Publication Data

US 2004/0046467 A1 Mar. 11, 2004

Related U.S. Application Data

(63) Continuation-in-part of application No. 09/709,794, filed on Nov. 10, 2000, now abandoned.

(51) Int. Cl.
*H02K 7/09* (2006.01)
*F16C 32/04* (2006.01)

(52) U.S. Cl. .................. 310/90.5; 417/423.12

(58) Field of Classification Search .............. 310/90.5; 417/423.12, 423.14, 365; 360/99.08
See application file for complete search history.

(56) References Cited

U.S. PATENT DOCUMENTS

| | | | |
|---|---|---|---|
| 2,582,788 A * | 1/1952 | Mendelsohn | 310/90.5 |
| 4,471,331 A * | 9/1984 | Wyatt | 335/285 |
| 5,019,738 A * | 5/1991 | Weilbach et al. | 310/90.5 |
| 5,507,629 A | 4/1996 | Jarvik | 417/423.3 |
| 5,834,870 A * | 11/1998 | Tokushima et al. | 310/90 |
| 5,840,070 A | 11/1998 | Wampler | 604/131 |
| 5,883,449 A * | 3/1999 | Mehta et al. | 310/60 R |
| 5,894,181 A * | 4/1999 | Imlach | 310/90.5 |
| 6,265,798 B1 * | 7/2001 | Huang et al. | 310/90.5 |
| 2003/0146668 A1 * | 8/2003 | Sun et al. | 310/90.5 |
| 2004/0046467 A1 * | 3/2004 | Huang et al. | 310/90.5 |
| 2005/0140228 A1 * | 6/2005 | Yeh et al. | 310/90.5 |
| 2005/0184609 A1 * | 8/2005 | Chen et al. | 310/90.5 |
| 2005/0275299 A1 * | 12/2005 | Horng et al. | 310/90.5 |

FOREIGN PATENT DOCUMENTS

| | | | |
|---|---|---|---|
| GB | 2335242 | * | 9/1999 |
| JP | 55-36635 | | 3/1980 |
| JP | 62-95952 | * | 5/1987 |
| JP | 06-235420 | * | 8/1994 |
| JP | 7-143704 | * | 6/1995 |
| JP | 2000-078796 | * | 3/2000 |

OTHER PUBLICATIONS

Translation of French Pat. 1,273,897 Sep. 11, 1961.

* cited by examiner

*Primary Examiner*—Karl Tamai
(74) *Attorney, Agent, or Firm*—Birch, Stewart, Kolasch & Birch, LLP

(57) ABSTRACT

A magnetic bearing assembly having a magnetic portion for simultaneously generating axially and radially magnetic forces and a bearing portion for supporting a shaft upon its rotation is disclosed. The magnetic bearing assembly according to the present invention can be utilized in a motor of a cooling fan to provide the substantially frictionless rotation and the precise position of the shaft. Thus, it requires no lubrication, results in less abrasion and produces low noise, all of which contribute to extend the operating life of the bearing.

9 Claims, 10 Drawing Sheets

HEAT DISSIPATING DEVICE WITH A COMBINATION BEARING ASSEMBLY HAVING MAGNETIC BEARING RINGS AND A SLEEVE BEARING

The present invention is a continuation-in-part application of the parent application bearing Ser. No. 09/709,794 and filed on Nov. 10, 2000 now abandoned.

FIELD OF THE INVENTION

The present invention relates to a magnetic bearing assembly, and more particularly to a magnetic bearing assembly capable of generating radially and axially repulsive or attractive magnetic fields.

BACKGROUND OF THE INVENTION

A bearing is customarily used to support a rotating shaft of a motor when a rotor rotates around the stator circumferentially.

There are two general types of bearings: a ball bearing and a self-lubricating bearing.

Please refer to FIGS. 1(a) and 1(b). The ball bearing 1 includes an inner ring 13 which includes a groove as a raceway, an outer ring 12 which also includes a groove as a raceway and a plurality of balls 11 which are inserted between respective grooves of the inner and outer rings. The inner ring 13 is usually fixed to a rotary shaft 21 of a rotor, and the outer ring 12 is fixed to a base or a stator 23. The upper side of the ball bearing 1 is urged against a spring 22 for facilitating smooth rotation.

Upon rotating the shaft 21, the balls 11 of the ball bearing 1 race around the grooves inward the outer ring 12 and outward the inner ring 13. After the ball bearing 1 is used for a certain period of time, the fatigue of the metal material is customarily found, thereby causing the balls 11 and the surface of the inner ring 13 or the outer ring 12 to be abraded.

Referring to FIGS. 2(a) and 2(b), a self-lubricating bearing 3 manufactured of polymeric material is usually in a shape of a sleeve and it contains minute passages or channels carrying therein the lubricating oil 31 such that the oil 31 can be deposited on the shaft 21 by diffusion into the inner wall 32 upon rotation of the shaft 21. The inner wall 32 of the self-lubricating bearing 3 usually contacts with a rotary shaft 21, and the outer wall 33 is fixed to a base 23.

In contrast, the ball bearing 1 can perform under heavy loads and has a long life; however, it is costly and has the disadvantage of being abraded. The self-lubricating bearing 3 has good self-lubricating properties to reduce abrasion and is cheaper than the ball bearing; however, it generally incapable of being operated with large loads and its life is not very long.

It is therefore tried by the present invention to overcome the above-described problems.

SUMMARY OF THE INVENTION

It is an object of the present invention to provide a magnetic bearing assembly having an extended lifetime and adapted to be used in a heat-dissipating device such as a cooling fan.

It is further an object of the present invention to provide a magnetic bearing assembly having a low cost.

The magnetic bearing assembly according to the present invention comprises a magnetic portion connected to a shaft and a base for generating a repulsive magnetic field and a bearing portion connected to the shaft and the base for supporting said shaft upon rotation of the shaft.

Certainly, the repulsive magnetic field can be one of a radially repulsive magnetic field and an axial repulsive magnetic field.

Preferably, the bearing portion is a sleeve bearing.

Preferably, the base is a stator of a motor.

In an aspect of the present invention, the magnetic portion includes an upper magnetic portion and a lower magnetic portion, wherein the upper magnetic portion and the lower magnetic portion are disposed symmetrically and each includes a first magnetic ring, a second magnetic ring and a third magnetic ring. The first magnetic ring and the third magnetic ring are connected to the shaft, and the second magnetic ring is connected to the base. The second magnetic ring and the third magnetic ring are disposed in a radial alignment with each other to have the same polar disposition. The first magnetic ring and the second magnetic ring are disposed in an axial alignment with each other to have an opposite polar disposition.

In another aspect of the present invention, the magnetic portion includes an upper magnetic portion and a lower magnetic portion, wherein the upper magnetic portion includes an inner magnetic ring and an outer magnetic ring and the lower magnetic portion includes a first magnetic ring, a second magnetic ring and a third magnetic ring. The inner magnetic ring and the outer magnetic ring are disposed in a radial alignment with each other to have the same polar disposition. The first magnetic ring and the third magnetic ring are connected to the shaft and the second magnetic ring is connected to the base. The first magnetic ring, the second magnetic ring and the third magnetic ring are disposed in a radial alignment with each other to have opposite polar disposition.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
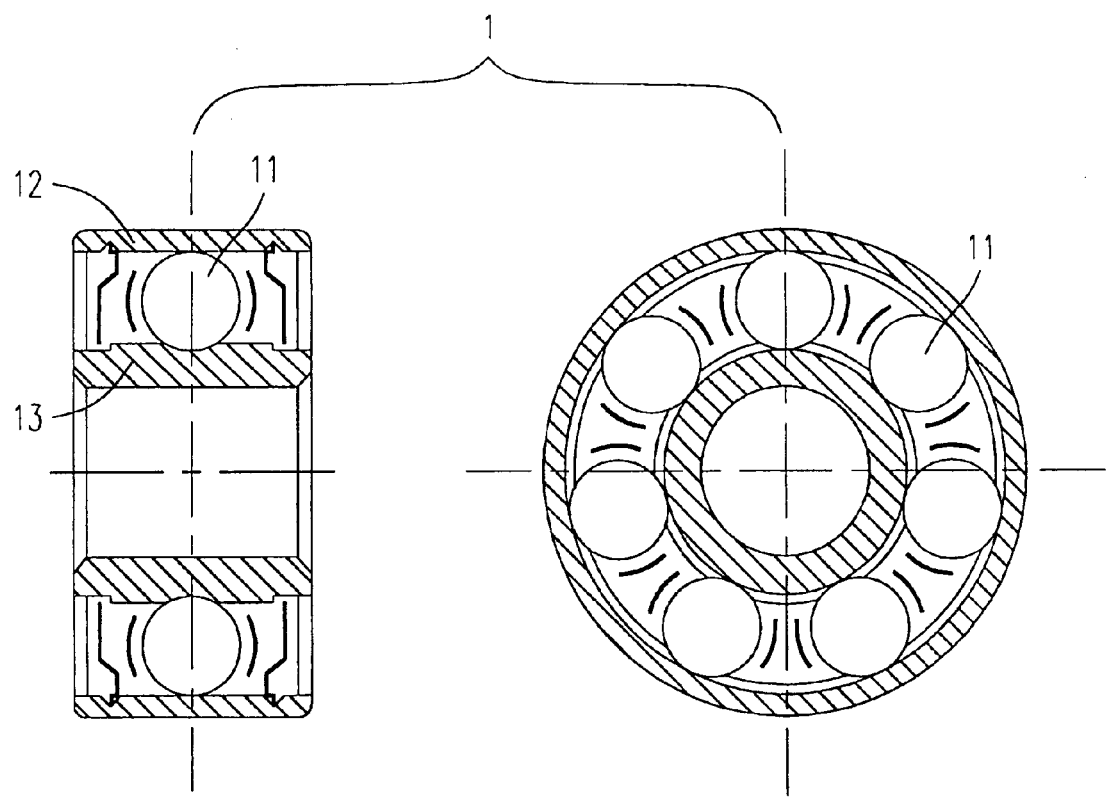
FIG. 1(a) is a sectional view of a conventional ball bearing.
Figure 1B:
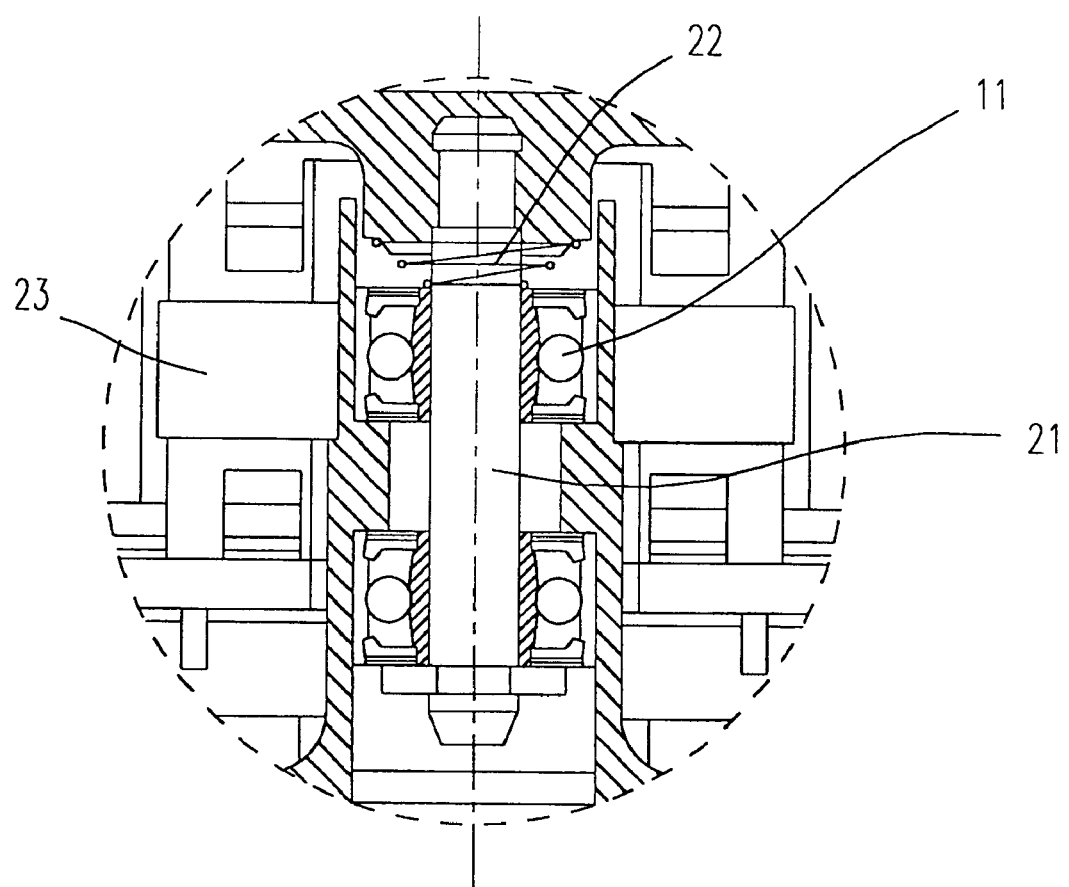
FIG. 1(b) shows a schematic view for an application of the ball bearing of FIG. 1(a)
Figure 2A:
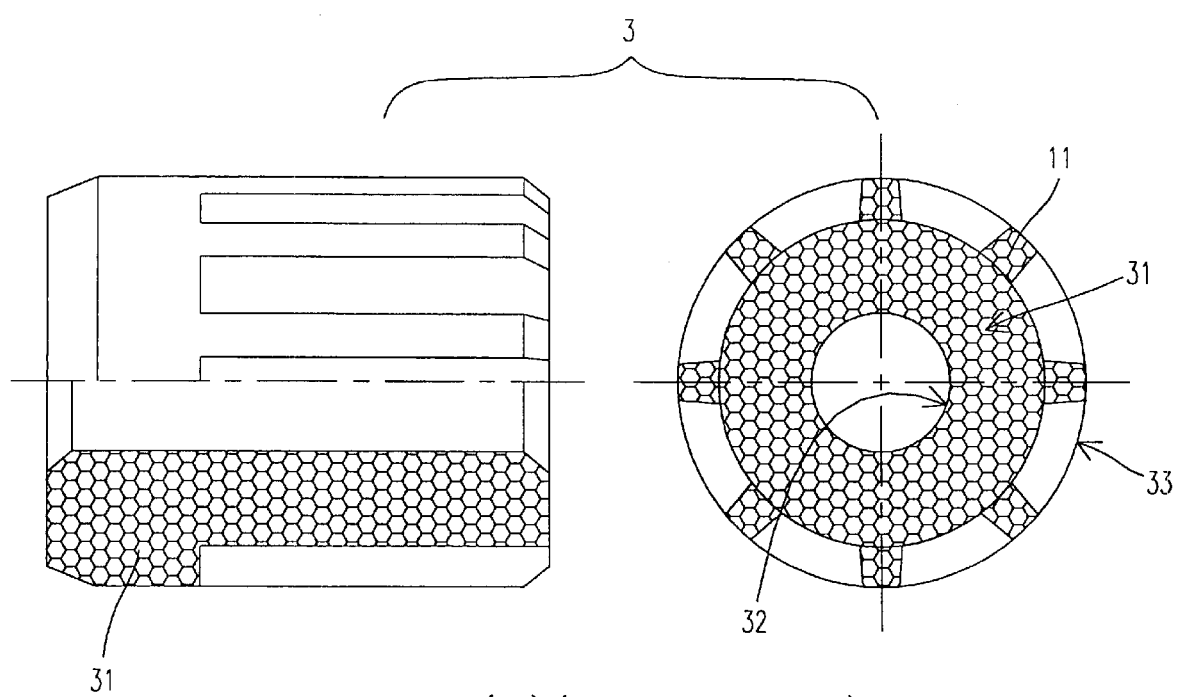
FIG. 2(a) is a sectional view of a conventional self-lubricating bearing.
Figure 2B:
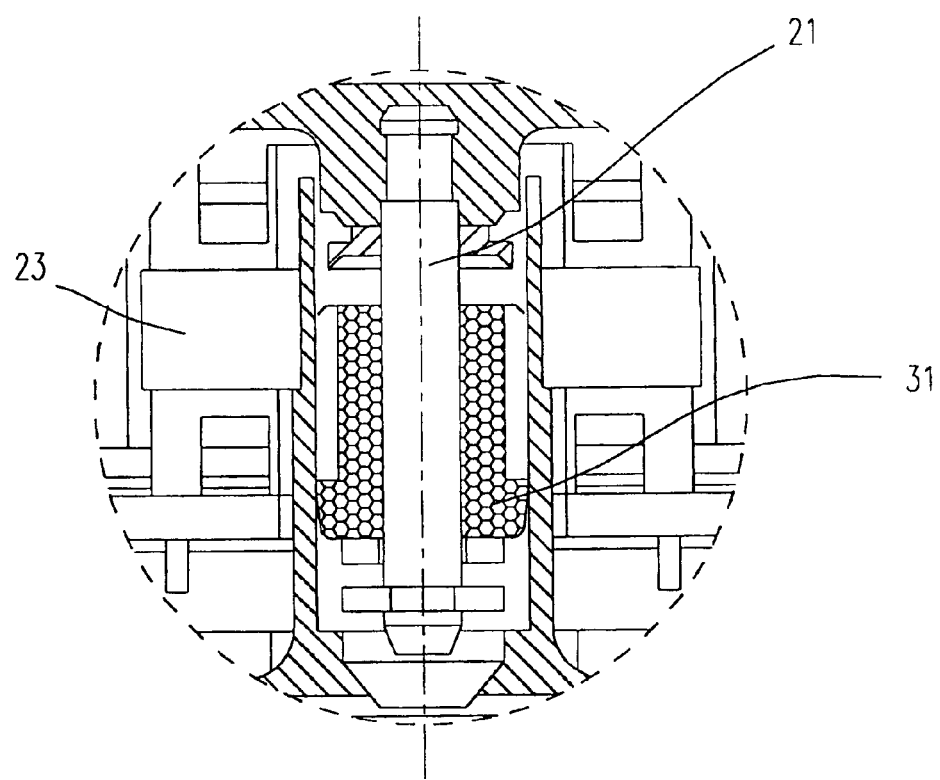
FIG. 2(b) shows a schematic view for an application of the self-lubricating bearing of FIG. 2(a)
Figure 3A:
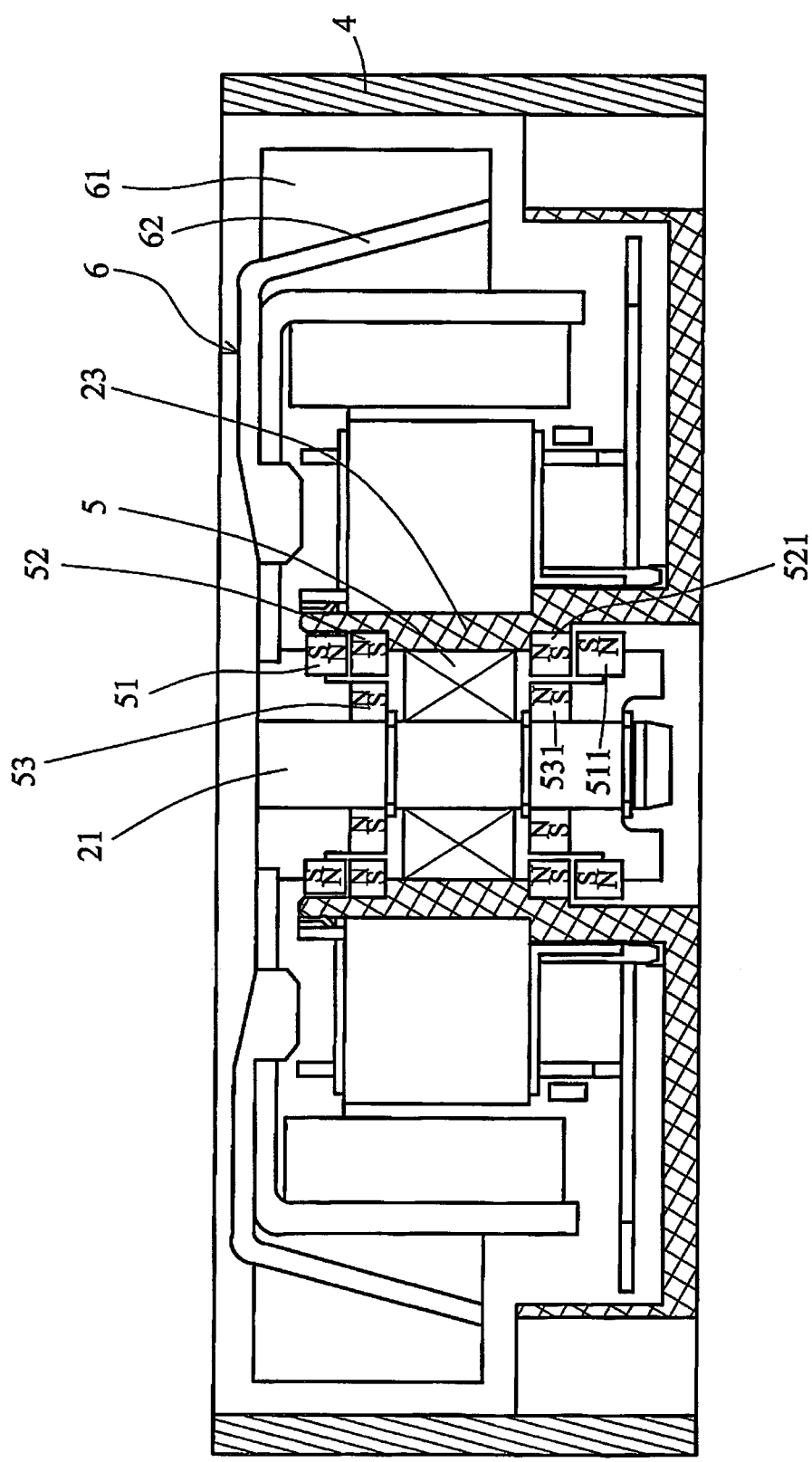
FIG. 3 is a cross-sectional view of the magnetic bearing assembly applied to a cooling fan according to a first embodiment of the present invention.
Figure 3B:
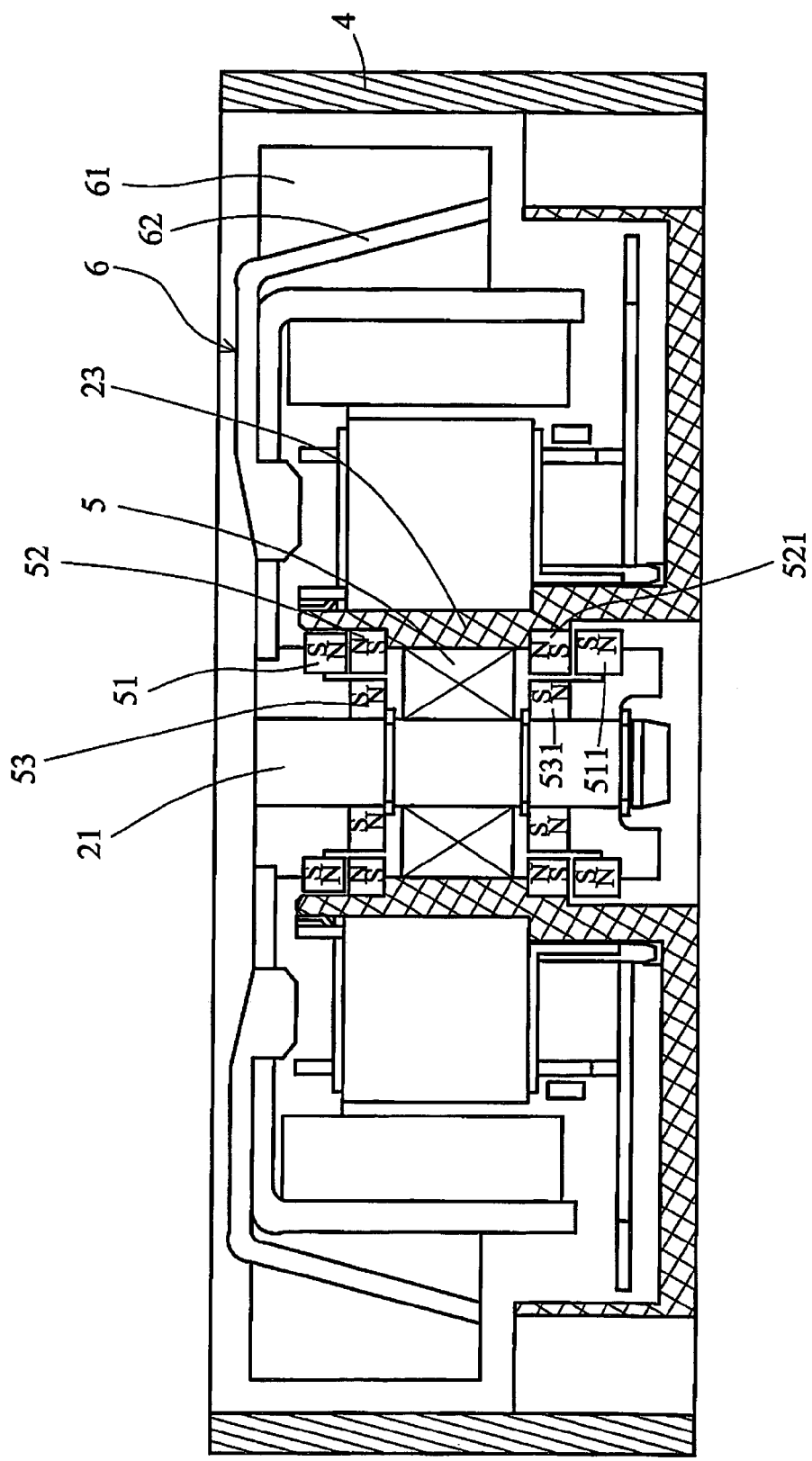
Figure 3C:
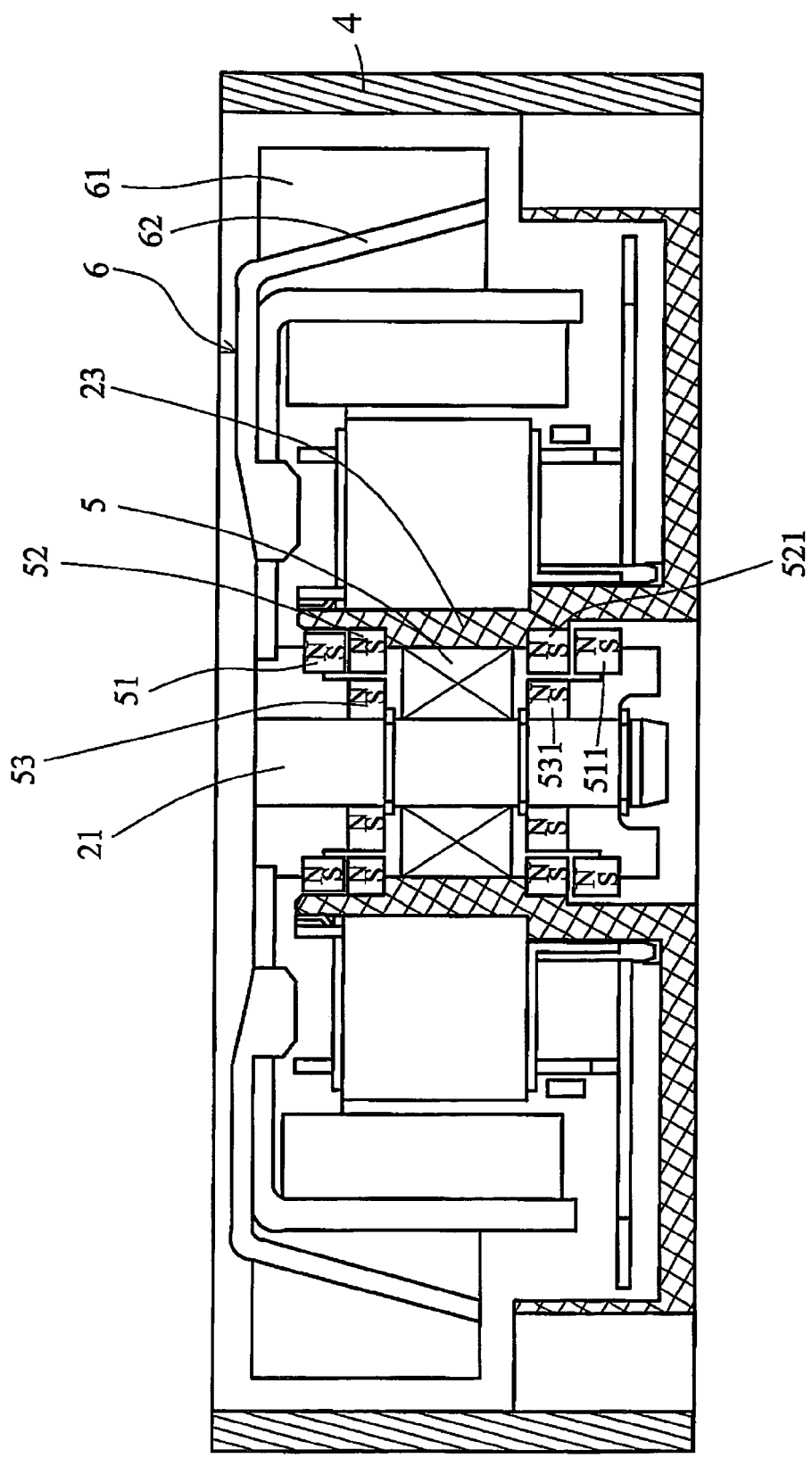

FIGS. 3(a) to 3(c) are schematic diagrams of the magnetic bearing assembly applied to a cooling fan according to the first embodiment of the present invention. The cooling fan includes a rotor 6, and a base 23. The rotor 6 has an impeller 61, a hub 62 and a shaft 21. The base 23 is for supporting the rotor 6. The magnetic bearing assembly includes a magnetic portion and a bearing portion disposed on the inner side of the hub 62. The bearing portion is a sleeve bearing 5. The magnetic portion includes an upper magnetic portion constituted by three magnetic rings 51, 52 and 53, and a lower magnetic portion composed of three magnetic rings 511, 521 and 531. In the upper magnetic portion, the first magnetic ring 51 and the third magnetic ring 53 are coupled to the shaft 21 and the second magnetic ring 52 is connected to the base 23 of a frame 4 of the cooling fan. The second magnetic ring 52 and the third magnetic ring 53 are disposed in a radial alignment, wherein these two rings are assembled to have the same poles on the opposing ends respectively for generating the repulsive magnetic field. In addition, the first magnetic ring 51 and the second magnetic ring 52 are disposed in an axial alignment, wherein the first magnetic ring 51 and the second magnetic ring 52 are assembled to have the same poles on the opposing ends respectively for generating an axially repulsive magnetic field. The radially repulsive magnetic field generated between the second magnetic ring 52 and the third magnetic ring 53, and the axially repulsive magnetic field generated between the first magnetic ring 51 and the second magnetic ring 52 allow to reduce the friction between the sleeve bearing 5 and the shaft 21 upon rotation of the shaft (as shown in FIG. 3(a)). Alternatively, the three magnetic ring 51, 52, and 53 can have different disposition, wherein the axially magnetic forces are repulsive magnetic forces and radially magnetic forces are attractive magnetic forces. That is, the second magnetic ring 52 and the third magnetic ring 53 are assembled to have opposite poles on the opposing ends respectively for generating axially attractive magnetic force while the disposition of the first and second magnetic rings 52, 53 remain the same (as shown in FIG. 3(b)). Likewise, the three magnetic rings 511, 521 and 531 in the lower magnetic portion are disposed symmetrically in the same fashion as the three magnetic rings 51, 52 and 53 in the upper portion, effectively reducing the friction between the sleeve bearing 5 and the shaft 21 upon the operation of the cooling fan.

Otherwise, the first magnetic ring 51, 511 and the second magnetic ring 52, 521 are assembled to have opposite poles on the opposing ends respectively for generating axially attractive force while the second magnetic ring 52, 521 and the third magnetic ring 53, 531 are assembled to have the same poles on the opposing ends respectively for generating radially repulsive force (as shown in FIG. 3(c)). This arrangement can also function to successfully reduce the friction between the sleeve bearing 5 and the shaft 21 upon the operation of the cooling fan.

The upper magnetic portion and the lower magnetic portion are symmetrically disposed on both opposite sides of the bearing portion 5 for simultaneously generating the radially and axially repulsive magnetic forces so as to prevent the friction between the sleeve bearing and the shaft, and to obtain the accurate position of the shaft while the cooling fan is rotating.

Figure 4A:
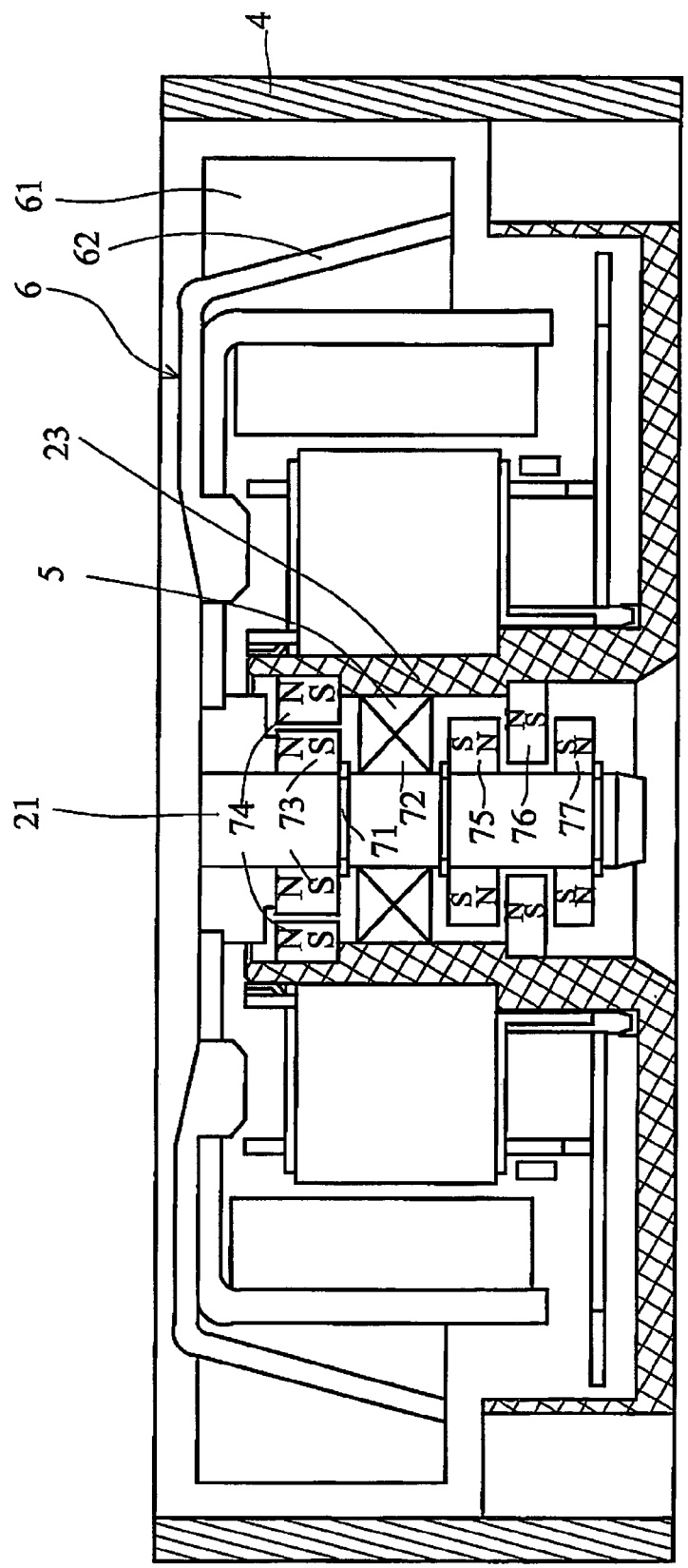
FIG. 4 is a cross-sectional view of the magnetic bearing assembly applied to a cooling fan according to a second embodiment of the present invention.
Figure 4B:
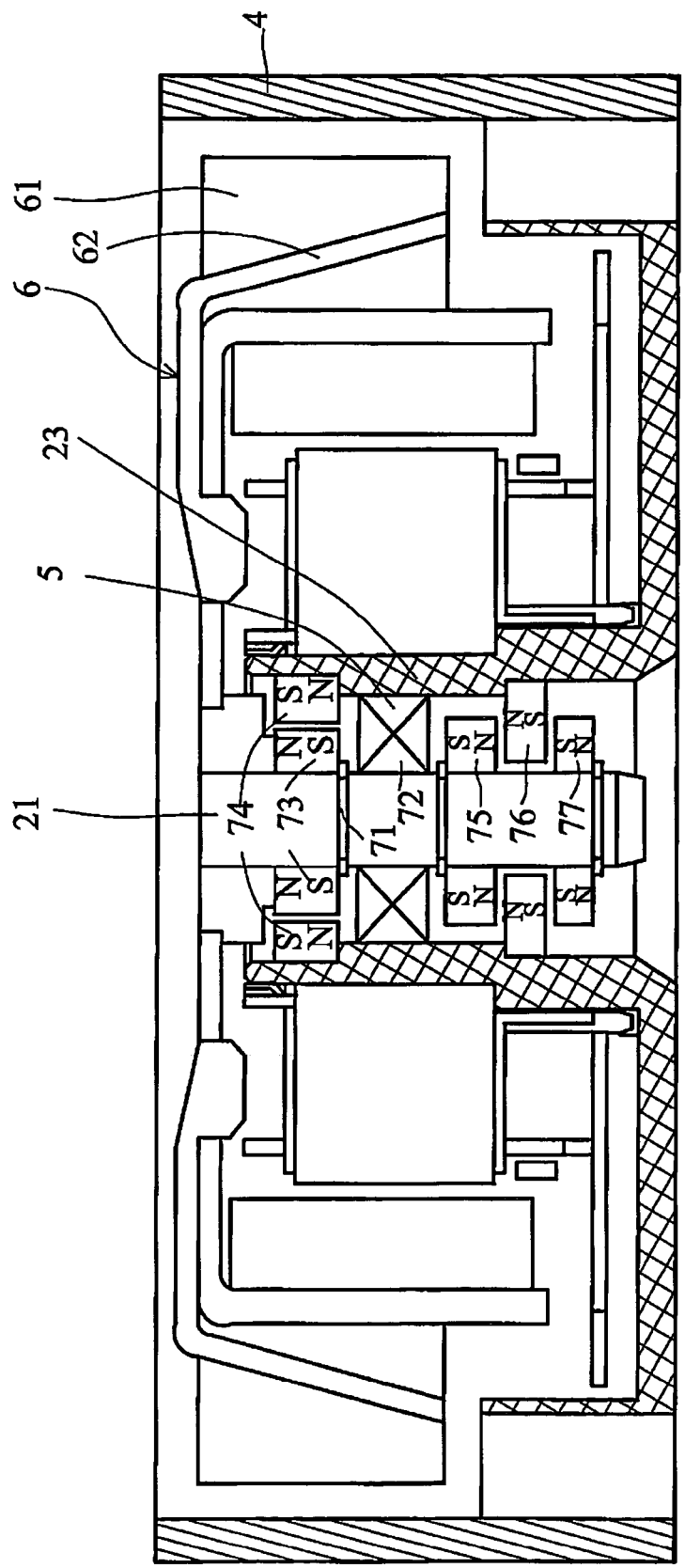
Figure 4C:
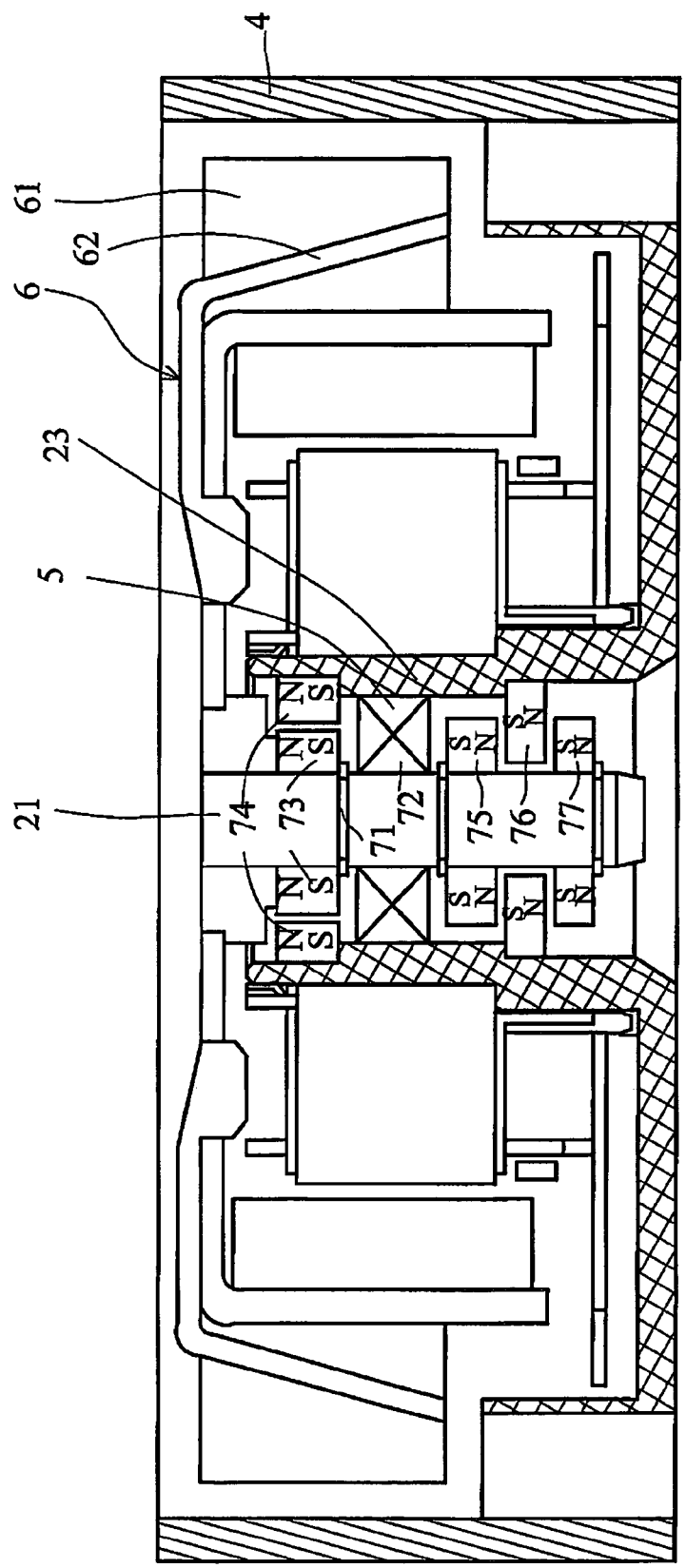

FIGS. 4(a) to 4(c) are schematic diagrams of the magnetic bearing assembly applied to the cooling fan according to the second embodiment of the present invention. The cooling fan includes a rotor 6, and a base 23. The rotor 6 has an impeller 61 and a shaft 21. The base 23 is for supporting the rotor 6. The magnetic bearing assembly includes a magnetic portion and a bearing portion. The bearing portion is a sleeve bearing 5. The magnetic portion includes an upper magnetic portion having an inner magnetic ring 73 and an outer magnetic ring 74, and a lower magnetic portion having three magnetic rings 75, 76 and 77. In the upper magnetic portion, the inner magnetic ring 73 is connected to the shaft 21 and the outer magnetic ring 74 is connected to the base 23 of the frame of the cooling fan. These two magnetic rings 73 and 74 are disposed in a radial alignment to have the same poles on the opposing ends respectively for generating a repulsive magnetic force. In the lower magnetic portion, the first magnetic ring 75 and the third magnetic ring 77 are connected to the shaft 21 and the second magnetic ring is connected to the base 23. These three magnetic rings 75, 76 and 77 are disposed in an axial alignment to have to have the same poles on the opposing ends respectively for generating the axially repulsive magnetic forces (as shown in FIG. 4(a)). Alternatively, the inner magnetic ring 73 and the outer magnetic ring 74 can be disposed in a radial alignment to have opposite poles on the opposing ends respectively (as shown in FIG. 4(b)). Likewise, the first magnetic ring 75, the second magnetic ring 76 and the third magnetic ring 77 can also be disposed in an axial alignment for generating axially attractive magnetic forces (as shown in FIG. 4(c)). Therefore, the friction between the sleeve bearing 5 and the shaft 21 upon the rotation of the cooling fan is considerably reduced.

The upper magnetic portion and the lower magnetic portion are disposed on the opposite sides of the sleeve bearing 5 for respectively generating the radially repulsive magnetic force and the axially repulsive magnetic force at the same time so as to effectively reduce the friction between the sleeve bearing and the shaft.

The magnetic bearing assembly according to the present invention provides the substantially frictionless rotation of the shaft when it is applied to a motor of the cooling fan. Thus, it requires no lubrication, results in less abrasion and produces low noise, all of which contribute to extend the operating life of the bearing. Furthermore, the magnetic rings can be made of plastic magnet for reducing the cost of production and the cost of the magnetic bearing assembly is close to the self-lubricating bearing. Moreover, the aspect of the present invention is not limited to utilize the axially and radially repulsive magnetic force. The attractive magnetic force generated between the magnetic rings can also be applied.

While the foregoing has been described in terms of preferred embodiments of the invention, it will be appreciated by those skilled in the art that many variations and modifications may be made without departing from the principles and spirit of the invention, the scope of which is defined by the appended claims.

What is claimed is:

1. A heat-dissipating device, comprising:
   a rotor having an impeller and a shaft;
   a base for supporting said rotor;
   a magnetic portion coupled to said shaft and said base, comprising:
   a first magnetic portion comprising a first magnetic ring, a second magnetic ring and a third magnetic ring, wherein the first magnetic ring is axially aligned with the second magnetic ring for generating an axial magnetic force between the rings, and the third magnetic ring is radially aligned with the second magnetic ring for generating a radial magnetic force between the rings; and
   a second magnetic portion comprising a first magnetic ring, a second magnetic ring and a third magnetic ring, wherein the first magnetic ring is axially aligned with the second magnetic ring for generating an axial magnetic force between the rings, and the third magnetic ring is radially aligned with the second magnetic ring for generating a radial magnetic force between the rings; and a bearing portion coupled to said shaft and said base for supporting said shaft upon rotation of said shaft.

2. The heat-dissipating device according to claim 1, wherein said axial and radial magnetic forces are repulsive magnetic forces or attractive magnetic forces, respectively.

3. The heat-dissipating device according to claim 1, wherein said first magnetic portion and said second magnetic portion are disposed symmetrically on two opposite sides of said bearing portion, respectively.

4. The heat-dissipating device according to claim 1, wherein said first magnetic ring and said third magnetic ring of both said first and second magnetic portions are connected to said shaft and said second magnetic ring of both said first and second magnetic portions is connected to said base.

5. A heat-dissipating device, comprising:
a rotor having an impeller and a shaft;
a base for supporting said rotor;
a magnetic portion coupled to said shaft and said base for generating a radial magnetic force and an axial magnetic force, wherein said magnetic portion includes a first magnetic portion with two magnetic rings aligned radially for substantially primarily providing said radial magnetic force and a second magnetic portion with three magnetic rings disposed axially for substantially primarily providing said axial magnetic force; and a bearing portion coupled to said shaft and said base for supporting said shaft upon rotation of said shaft.

6. The heat-dissipating device according to claim 5, wherein said first magnetic portion includes an inner magnetic ring and an outer magnetic ring and said second magnetic portion includes a first magnetic ring, a second magnetic ring and a third magnetic ring.

7. The heat-dissipating device according to claim 6, wherein said first magnetic ring and said third magnetic ring are connected to the shaft and said second magnetic ring is connected to said base.

8. The heat-dissipating device according to claim 6, wherein said inner magnetic ring and said outer magnetic ring are disposed in a radial alignment with identical poles opposing each other for generating repulsive magnetic field.

9. The heat-dissipating device according to claim 6, wherein said first magnetic ring, said second magnetic ring and said third magnetic ring are disposed in an axial alignment with identical poles opposing each other for generating repulsive magnetic field.

* * * * *